(12) United States Patent
Frutin

(10) Patent No.: US 6,403,137 B1
(45) Date of Patent: Jun. 11, 2002

(54) METHOD OF PRODUCING A FROTHED LIQUID

(76) Inventor: Bernard Derek Frutin, Jaapsion Farm, Uplawmoor, Renfrewshire G78 3BL (GB)

( * ) Notice: Subject to any disclaimer, the term of this patent is extended or adjusted under 35 U.S.C. 154(b) by 0 days.

(21) Appl. No.: 09/367,754

(22) PCT Filed: Feb. 19, 1998

(86) PCT No.: PCT/GB98/00533
§ 371 (c)(1),
(2), (4) Date: Aug. 18, 1999

(87) PCT Pub. No.: WO98/36671
PCT Pub. Date: Aug. 27, 1998

(30) Foreign Application Priority Data

Feb. 19, 1997 (GB) ............................................. 9703482
Jul. 11, 1997 (GB) ............................................. 9714593

(51) Int. Cl.[7] ........................... B65D 79/00; A47J 43/12
(52) U.S. Cl. ........................ 426/477; 426/116; 426/118; 426/405; 426/590
(58) Field of Search ................................. 426/116, 115, 426/112, 130, 477, 590, 118, 580, 405; 222/402.21, 402.1, 394

(56) References Cited

U.S. PATENT DOCUMENTS

| 3,868,978 A | | 3/1975 | Knopf ........................... 141/19 |
| 4,374,155 A | * | 2/1983 | Igoe et al. .................... 426/569 |
| 4,756,347 A | * | 7/1988 | Hagan et al. .................. 141/21 |
| 4,804,552 A | * | 2/1989 | Ahmed et al. ............... 426/580 |
| 4,919,960 A | * | 4/1990 | Ahmed et al. ............... 426/580 |
| 5,553,753 A | * | 9/1996 | Abplanalp ................... 222/387 |

FOREIGN PATENT DOCUMENTS

| EP | 0 078 789 A2 | | 5/1983 | ........... B65D/77/28 |
| EP | 0 360 375 A1 | | 3/1990 | ............. B67C/3/02 |
| EP | 0 520 602 A1 | | 12/1992 | ........... B65D/79/00 |
| GB | 2101225 | * | 1/1983 | ............. F17C/1/16 |
| WO | 96/33618 | | 10/1996 | ........... A23C/9/152 |

* cited by examiner

Primary Examiner—Nina Bhat
(74) Attorney, Agent, or Firm—Ratner & Prestia

(57) ABSTRACT

The method involves the steps of filling a plastic container to between 20% to 50% capacity, then filling the remaining headspace with pressurized gas, for example between 20 psi and 150 psi, and sealing the container. Once the contents have reached equilibrium, the seal is breached to produce the frothed liquid. The method, and containers, disclosed have many significant advantages over known arrangements, in particular, there are significant cost savings associated with the method and containers of the present invention.

6 Claims, 4 Drawing Sheets

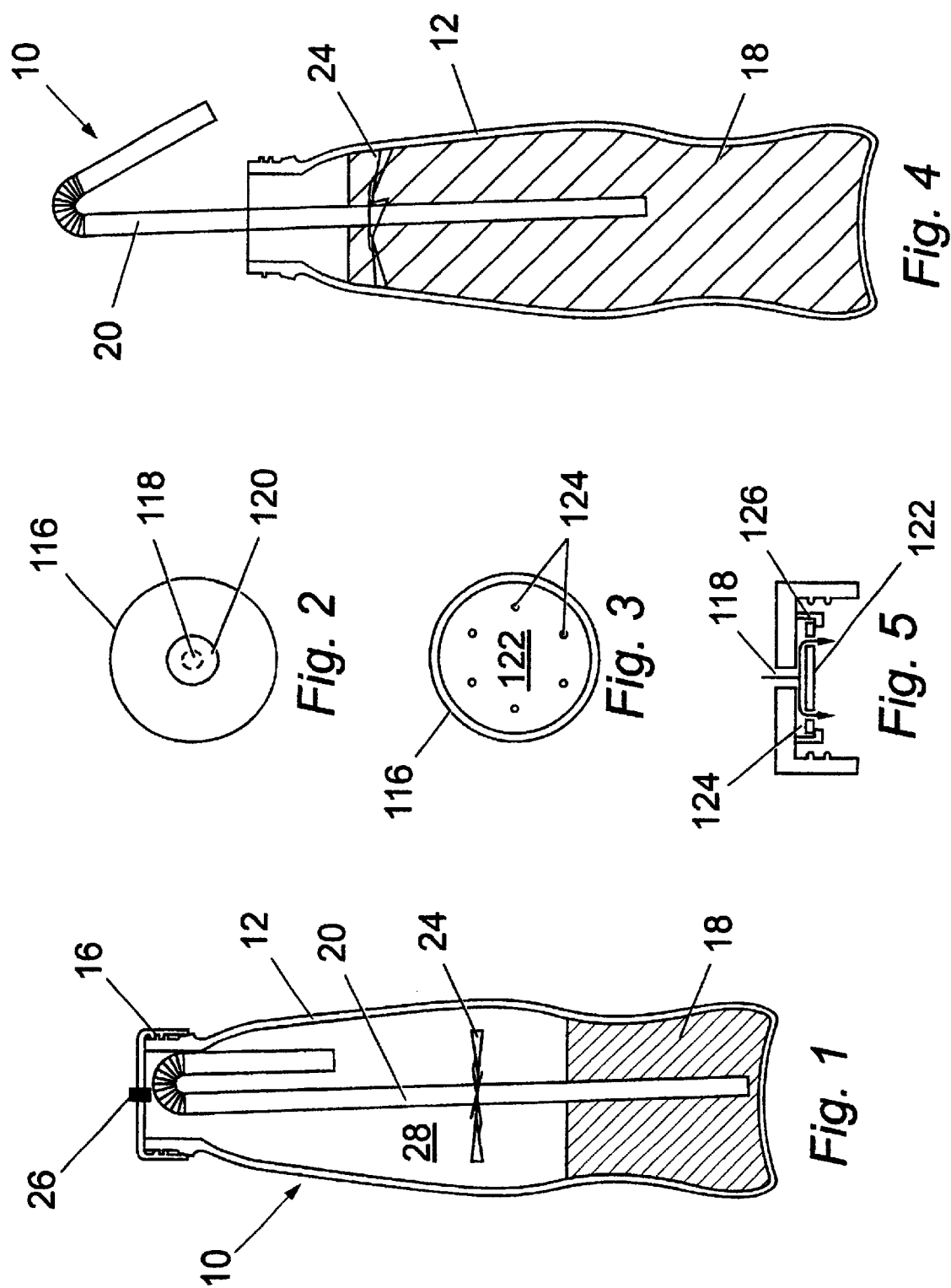

METHOD OF PRODUCING A FROTHED LIQUID

This application claims benefit under 35 U.S.C. 371 of PCT/GB98/00533 filed Feb. 19, 1998.

This invention relates to a method of producing a frothed liquid. Particularly but not exclusively it relates to a method of producing a self-foaming beverage for immediate consumption by a consumer, such as a self-foaming refrigerated milk shake drink. It also relates to a method of frothing more viscous liquids to produce a whipped effect, for example to produce whipped cream.

BACKGROUND OF THE INVENTION

It is well known that mixing of liquid beverages with various gases produces popular types of drink, such as carbonated water, "fizzy" lemonade and even self-foaming beers and lagers. Conventionally, in production plants, these types of beverages are produced by filling into individual containers such as bottles or cans from a refrigerated saturation tower. In these well known saturation towers the liquid flows down through numerous platelets or glass balls in the tower, which increase the surface area of the liquid, while gas surrounds and is absorbed into the liquid.

When the beverage reaches the bottom of the saturation tower it is dispensed by bottom filling into the container leaving only a minimal "headspace" above the beverage. "Headspace" is defined to be the liquid-free space inside the container above the surface of liquid in the container.

This method is in common use for the above-mentioned drinks, and its use has been suggested for milk and milk-based products, for example by the method disclosed in Patent document WO 96/33618.

However introducing gas into milk or similar liquids by such a method has the significant disadvantage that, prior to capping of the product, when it is opened to the atmosphere during the filling process the gas expands and is released at such a rate as to cause overflow of the beverage out of the container, due to the absorption time required for a milk-type product to be saturated with gas in a saturation tower being undesirably long. For example, the absorption time may be up to an hour at 9° C. for nitrous oxide into milk, compared to 2½ minutes for carbon dioxide into water. Furthermore if the product fill is reduced to say one third of the container capacity with two thirds headspace to allow expansion of the product for drinking from the container, for example using a straw, then the problem arises that the saturated gas leaves the product on storage to fill the headspace leaving the beverage itself with insufficient gas to create a self-foaming effect.

It would be desirable to have a method of producing a self-foaming beverage without pre-dissolving the gas in the liquid and which provided the consumer with a palatable drink on breaching the beverage container.

SUMMARY OF THE INVENTION

According to a first aspect of the present invention there is provided a method of producing a frothed liquid comprising the steps of filling a container with the liquid leaving a headspace above the liquid, introducing pressurised gas into the headspace and sealing the container.

The container is preferably then left for a period of time during which the gas is absorbed into the liquid. The period of time may be 24 hours during which the contents of the container reach equilibrium at ambient temperature, for example while the product is transported to a retail outlet. Alternatively, or in addition, the container may be shaken during or after filling to increase the absorption rate of the gas into the liquid. The liquid may also be cooled to reduce absorption time. Once the container is shaken and the seal is breached the beverage may foam up to substantially fill the container and be ready to be consumed, for example through a drinking straw or by pouring the beverage directly into a glass. Alternatively the frothed liquid may be released via a valve mechanism provided on the container.

Preferably the liquid used in the method is one having a high viscosity, for example a viscosity higher than that of water such as the viscosity of cream at ambient temperature. This helps trap expanding gas bubbles after the container is breached, thereby prolonging the stability of the foamed beverage. The liquid may, for example, have a high fat content. Most preferred examples of liquids are milk, yoghurts, creams and any of the foregoing containing alcohol, such as milk-based liqueurs. Examples would be GODET (RTM) or BAILEYS (RTM) liqueur.

Preferably the container is a plastic bottle. The plastic may be polyethylene terephthalate (PET). This has the advantage of being much cheaper than an aerosol can, for example. The plastic bottle may be fitted with a conventional lid modified by the inclusion of a valve. The valve may be a standard aerosol valve. It may be a tilt valve. In another example, the container may be of glass.

In the example where the liquid is cream, the method of the present invention produces cream having a whipped texture and appearance.

Preferably the container is for a single use only. For example, when a customer purchases the container with cream or liquid therein, they use it only once to produce whipped cream or frothed liquid, and do not store the container, part full, for any future use.

This overcomes the problem of the cream (or other liquid) becoming frothed inside the bottle, as can happen when a relatively small amount of cream (or liquid) is left in the container between uses. Alternatively, the container may be provided with design features for urging any liquid (which may be frothed) toward the container opening to allow for further use of the container.

In another example, the container may be a tub. The tub may have liqueur and/or cream therein, so that when breached, a blancmange-type dessert is produced.

Preferably the container and its contents are stored at a temperature below room temperature.

Preferably the gas is nitrous oxide.

Preferably the headspace is between 10% and 90% of the total volume of the container. For example the headspace may be between 50% and 80%.

Preferably the gas is pressurised between 20 psi and 150 psi. For example, the gas in the headspace may initially be at a pressure of 120 psi (for cream in a PET bottle with a tilt valve fitted).

In a preferred embodiment the headspace is approximately 67%, being two thirds of the volume of the container. In the preferred embodiment the liquid takes up about one third of the container. Typically the gas is introduced under pressure of approximately 60 psi (4 bar).

Preferably the container is purged with the gas prior to filling with the liquid. The gas is typically pressure filled into the headspace. Alternatively it may be volume filled.

Preferably, the gas is filled into the headspace in the container via a one-way valve in the container. For example, where the container is a bottle, the one-way valve may be provided in the lid of the bottle. The one-way valve may be a rubber plug in the container. In the case of a rubber plug, the gas may be filled by insertion of a needle through the plug. On removal of the needle, the container is sealed. Alternatively the valve may be a single hole to the exterior of the container and one or more holes to the interior which are offset from the exterior hole. The interior holes may be on a platform spaced from the exterior hole, for example by a rubber stopper. In this case, the gas is filled through the exterior hole and reaches the inside of the container via the interior holes. The pressure of the gas inside the container then pushes the platform into contact with the container, forming a seal. As a further alternative, a standard rubber mushroom valve may be used.

Preferably the container is provided with a device for injecting a beverage-enhancing liquid into the container upon breach of the seal. The beverage-enhancing liquid may be coloured or flavoured. Typically when the seal is breached, the beverage-enhancing liquid is fired out of said device, hits the surface of the main liquid from and then mixes into the liquid during the foaming process. For example, a modified version of the device disclosed in Patent document WO 97/21605 may be used.

Preferably the container is provided with a drinking straw device which rises up in the container when the seal is breached forcing the straw into a position for drinking.

According to a second aspect of the present invention there is provided a beverage package comprising a container means having a closable top opening, cap means for capping the top opening of the container means to close and seal the container means in a substantially leak-proof manner, the cap means being selectively detachable from the top opening of the container means to unseal and open the container means, a quantity of foamable beverage initially within the container means, foaming means for foaming at least part of the quantity of beverage upon uncapping and opening of the container means, a drinking straw means disposed initially entirely within the container means, and interaction means attached to or forming part of the drinking straw means for interacting with the foaming beverage upon uncapping and opening of the container means to raise part of the drinking straw means through the now-open top of the container means.

The interaction means may comprise baffle means extending radially outwards from the drinking straw means to interact with the flow of rising foaming beverage upon the opening of the container means whereby to apply a lifting force to the drinking straw means. The baffle means may comprise turbulence-promoting means for promoting turbulence in the beverage and/or in the foam upon opening of the container. The interaction means preferably has the form of an impeller fan disc clipped around the drinking straw means part-way up the height thereof. The interaction means (of whatever form) is preferably formed and dimensioned, and preferably has a location in the drinking straw means, such as to prevent or impede the drinking straw means rising completely through the open top of the container means.

According to a third aspect of the present invention there is provided a beverage package comprising a container means having a closable top opening, cap means for capping the top opening of the container means to close and seal the container means in a substantially leak-proof manner, the cap means being selectively detachable from the top opening of the container means to unseal and open the container means, a quantity of foamable beverage initially within the container means, foaming means for foaming at least part of the quantity of beverage upon uncapping and opening of the container means, a drinking straw means disposed initially entirely within the container means, and turbulence inducing means disposed within the container means for inducing turbulence in the foaming beverage upon uncapping and opening of the container means.

The turbulence inducing means is preferably tethered within the container means or attached to a fixed point within the container means. The turbulence inducing means may take the form of baffle means to interact with the flow of rising foaming beverage upon the opening of the container means in a manner to induce turbulence in the foaming beverage, and preferably in a manner which enhances mixing of beverage components.

The foaming means in the second and third aspects of the invention may comprise a quantity of gas dissolved in the beverage in a concentration sufficient that depressurisation of the interior of the container means upon uncapping thereof induces gas to come out of solution to generate foam. Alternatively, or additionally, the foaming means may comprise an auxiliary container means initially containing pressurised gas releasable from the auxiliary container means into the beverage upon uncapping of the container means. The gas comprised in the foaming means may be an individual gas or a mixture of gases selected from the group of gases including (but not restricted to) carbon dioxide, nitrogen, and nitrous oxide.

In the second and third aspects of the invention, the beverage comprised in the beverage package may be an comestible liquid or mixture of liquids, but is preferably a milk-based beverage. Such a milk-based beverage may be whole milk or semi-skimmed milk or skimmed milk, with or without minor additives such as flavourings, sweeteners, and colourings; however, it is preferred that the milk-based beverage contains a substantial proportion of ethanol (ethyl alcohol), for example in the form of an alcoholic wine or an alcoholic liqueur. The milk-based beverage is preferably a naturally thick beverage, for example a yoghurt, but thickeners may optionally be added to achieve a requisite viscosity in the beverage.

According to a fourth aspect of the present invention there is provided a beverage package comprising a container means having a closable top opening, cap means for capping the top opening of the container means to close and seal the container means in a substantially leak-proof manner, the cap means being selectively detachable from the top opening of the container means to unseal and open the container means, a quantity of foamable beverage initially within the container means, foaming means for foaming at least part of the quantity of beverage upon uncapping and opening of the container means.

BRIEF DESCRIPTION OF THE DRAWING

Specific embodiments of the invention will now be described by way of example only with reference to the accompanying drawings in which:

FIG. 1 is a side view in cross-section of a container used in the method of the present invention shown filled with liquid and sealed;

FIG. 2 is a view from above of a cap containing a one-way valve which may be used to fill the container of FIG. 1;

FIG. 3 is a view from below of the cap of FIG. 2;

FIG. 4 is a side view in cross-section of the container of FIG. 1 showing the beverage ready for consumption;

FIG. 5 is a side view in cross-section of the cap of FIG. 2;

DETAILED DESCRIPTION OF THE INVENTION

Figure 8:
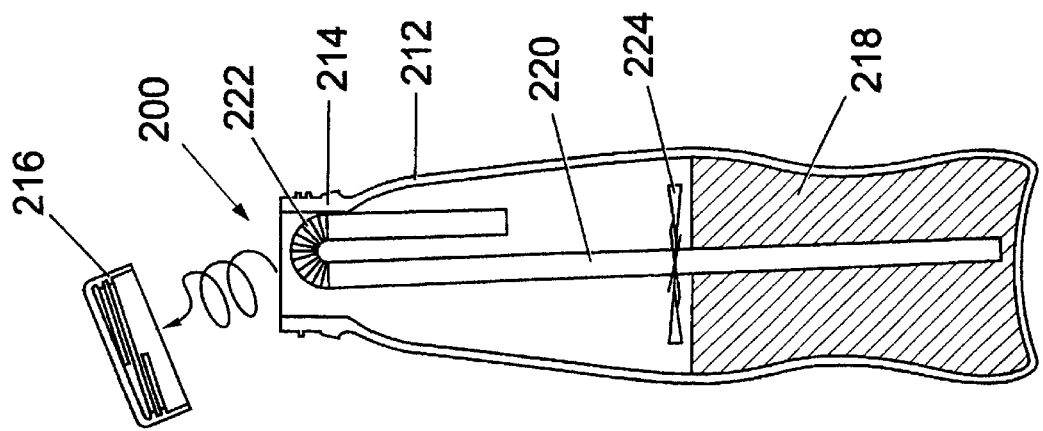
FIG. 8 shows the bottle of FIG. 6 as newly uncapped, and with the beverage commencing to foam and rise.

Referring to the accompanying drawings, FIG. 1 shows a container 10, in this case a standard bottle 12 having a capacity of approximately 500 ml and manufactured from polyethylene terephthalate (PET) or other plastics material. The bottle 12 has a 32 mm diameter neck and is provided with a threaded polypropylene cap 16.

The cap 16 incorporates a one-way valve which in the example of FIG. 1 is in the form of a rubber plug 26. However in other embodiments a different type of valve may be used. For example, a cap 116 incorporating an alternative one-way valve is shown in FIGS. 2, 3 and 5. This valve includes a hole 118 on the exterior (or top surface) of the cap 116 through which gas may be filled into the container. Also shown in FIG. 2 is an optional decorative foil cover 120 which can be placed over the hole 118 to disguise it from the end consumer. On the underside of the cap 116 is a moveable platform 122 which is supported by a ring seal 126. This arrangement is most clearly seen in FIG. 5. The platform 122 is provided with a number of interior holes 124 and is made of a resilient material so that it is moveable between open and closed positions. In FIG. 5 the platform 122 is shown in the open position. As gas is filled through hole 118 the gas pressure keeps the valve open and the gas passes into the container via holes 124 in the direction shown by the arrows in FIG. 5. Once filling stops, the pressure of the gas within the container forces the platform 122 into contact with the top of the cap 116, ie the closed position, thereby forming a seal and preventing escape of the gas. As further alternatives to the foregoing, known one-way valves can be employed.

Turning back now to FIG. 1, in this example, prior to fitting the cap 16 to the bottle 12 the bottle 12 is purged with gas, in this case nitrous oxide, to remove contaminating air. It is then filled with liquid 18 to about one third capacity. The liquid 18 in this example is a milk-based liqueur but could be another liquid. Approximately 170 ml of liquid is used in this example. Therefore a headspace 28 of approximately two thirds of the volume of the container 10 remains. Other proportions are possible in other embodiments of the invention.

In this embodiment, following liquid fill, a drinking straw 20 is inserted into the bottle, as can be seen in FIG. 1. The straw 20 is fitted with a flotation device 24 the operation of which will be briefly explained below. The cap 16 is then fitted to the main body of the bottle 12. A gas filling head (not shown) then engages with the one-way valve 26 in the cap 16 and the container 10 is pressurised to 60 psi gauge through the one-way valve 26. As far as FIG. 1 is concerned, a hypodermic needle (not shown) may be inserted through the rubber plug 26 for gas filling. Alternatively, when using the valve of FIGS. 2 and 3 the filling head engages in hole 118 for filling.

It is possible to shake the container 10 and contents during filling to increase the absorption rate of the gas into the liquid 18. However, more simply, once the headspace 28 is filled and the container sealed (via the one-way valve) the container can simply be boxed and stored in the usual way and within approximately 24 hours the gas has saturated the liquid and reached equilibrium, the pressure in the bottle being reduced to about 55 psi. If the product in this example was refrigerated to 5° C. the pressure would reduce to about 45 psi at equilibrium. This is because of the substantial initial headspace and the ratio of that headspace to the liquid.

The product has the advantage that it need not be chilled. Filling can be achieved at ambient temperatures. However, it should be noted that chilling does increase absorption rate.

After filling with the gas is complete, an aluminium foil sealing disc 120 is heat sealed over the one-way valve on top of the cap 116.

When the end consumer is ready to drink the beverage, they simply refrigerate the container and its contents to approximately 5° C., twist the cap 16 and remove it. Chilling increases the viscosity of the liquid thereby prolonging the foaming effect. (Optionally the container 10 can be shaken prior to opening.) Once the cap 16 is removed the gas-saturated liquid is depressurised and the gas (nitrous oxide) begins to expand and come out of solution in the form of bubbles. In the example shown in FIGS. 1 and 4 the liquid 18 and bubbles rise upwards to completely fill the bottle (as can be seen from FIG. 4), subject to the bottle having been shaken prior to opening. As the mixture rises, the device 24 is pushed upwards thereby freeing the top end of the straw 20 for use by the consumer. In another possible embodiment, the beverage is simply poured into a glass, jug or the like for immediate consumption without any need for shaking. In the example described the beverage produced by the method of the invention is a thick, frothy, liqueur milk shake. The milk shake may stay frothy for up to half an hour or more before consumption, but is best used as soon after broaching as possible.

In the case where the container is not provided with a straw, and the beverage is to be poured into a glass for drinking, the container may be fitted with a device which injects flavour and/or colour into the container when the seal is breached. The flavour and/or colour then filtrates through the beverage as it is poured out, enhancing the taste and/or appearance of the beverage in the glass. For example, a "raspberry ripple" effect may be obtained.

The method described has the advantage that milk-based products can now be mixed with gases in a controllable and efficient manner, producing a far superior beverage than is possible with known methods.

Figure 6:
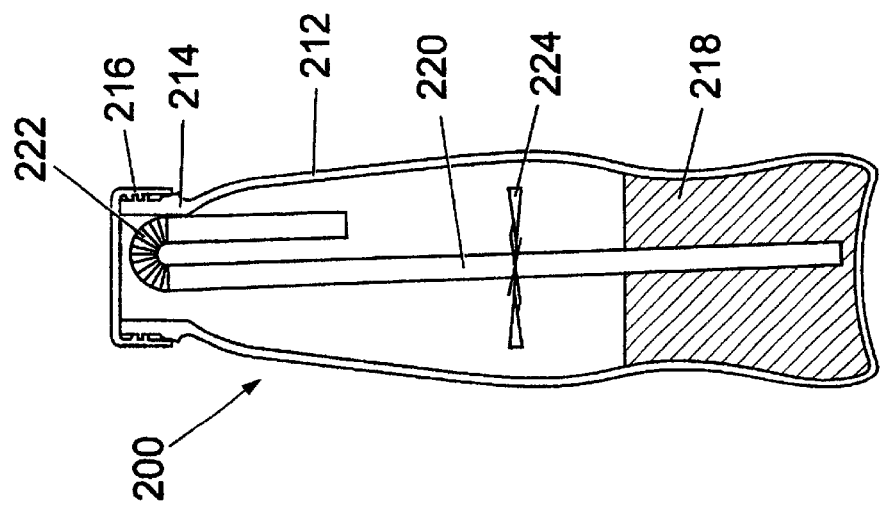
FIG. 6 is a diametral sectional elevation of a sealed bottle containing a foamable milk-based beverage, and a drinking straw having an impeller fan disc attached thereto.

Referring now to FIG. 6, a complete and self-contained beverage package 210 comprises a bottle 212 of any suitable material, for example a glass or a food-grade plastics material, eg PET (polyethylene terephthalate), which is preferably opaque to visible light such as to render invisible the contents of the bottle 212 in general and the internal level of liquid in particular. The bottle 212 is formed with an externally threaded neck 214 shaped and dimensioned to be a cooperative fit with a screw cap 216 by which the bottle 212 is initially closed and sealed.

Before being capped and sealed, the bottle 212 is pre-filled with a predetermined quantity of beverage 218, this quantity being selected to be substantially less than the total internal volume of the bottle 212 for reasons which will be explained subsequently. The beverage 218 is a mixture of yoghurt and an alcoholic liqueur. The beverage 218 is also saturated with dissolved nitrous oxide such that prior to opening of the bottle 212, the internal pressure of the bottle 212 is substantially greater than ambient atmospheric pressure.

The bottle 218 is also pre-packed with a drinking straw 220 of the known type having a corrugated portion 222 which allows the straw 220 to be folded double without transversely collapsing. The full length of the straw 220 is considerably greater than the height of the bottle 212 (see FIG. 11), but the corrugated portion 222 allows the straw 220 to be sufficiently shortened by folding as to fit entirely within the bottle 212 (see FIG. 6).

Figure 7:
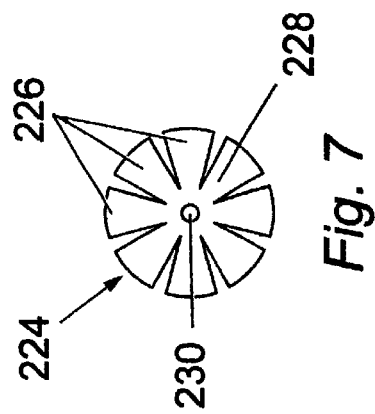
FIG. 7 is a plan view of the impeller fan disc of FIG. 6 as a separate component.

Referring to FIG. 7, this shows an impeller fan disc 224 which is of moulded plastics or stamped from sheet plastics to have eight equi-spaced blades 226 radially extending from a central hub 228. Each of the blades 226 is twisted with respect to the principal plane of the impeller fan disc 224 in an angular direction which may conveniently be termed "clockwise rising", ie if the disc 224 were rotating clockwise as viewed in FIG. 7, the leading edge of each blade 226 would be above the plane of FIG. 7 while the trailing edge of each blade 226 would be below the plane of FIG. 7. The overall diameter of the disc 224 is significantly greater than the internal diameter of the bottle neck 214, for a reason which will be explained subsequently. The hub 228 has a central perforation 230 dimensioned to allow the impeller fan disc 224 to be force-fitted onto and thereby secured to the exterior of the drinking straw 220 at a position somewhat above the surface of the quiescent beverage 218 in the capped and sealed bottle 212, as shown in FIG. 6.

The sealed beverage package 210 can be manufactured in bulk in a conventional beverage bottling and labelling plant (not shown), modified (if not already suitable) for the insertion of a drinking straw into each bottle, each inserted straw having an impeller fan disc previously attached thereto. If necessary or desirable, the newly filled and sealed packages 210 can be subjected to beverage preserving treatment, eg sustained refrigeration at a temperature suitable for maintaining the beverage non-toxic and potable for at least a predetermined period (ie until a nominal "use by" or "best before" date printed on the package 210 contemporaneously with loading and capping of the bottle 212).

Referring next to FIG. 8, this shows the initial stage of opening of the bottle 212 for the purpose of consuming the beverage 218 contained in the bottle 212. Firstly, the cap 216 is unscrewed from the bottle neck 214 and discarded. Removal of the cap 216 breaks the seal on the bottle 212 and opens the top of the bottle 212. The ullage of the bottle 212 (the liquid-free space inside the bottle 212 above the surface of the liquid beverage 218) was previously at a pressure substantially above ambient atmospheric pressure, and the ullage pressure drops substantially to ambient atmospheric pressure as soon as the cap 216 is unscrewed and removed from the top of the bottle 212. Consequently, the gas-saturated liquid beverage 218 is depressurised, and the previously dissolved nitrous oxide starts coming out of solution in the beverage in the form of numerous bubbles. This leads to foaming of the beverage 218, with concomitant volumetric expansion, and the start of such foaming and expansion is depicted in FIG. 8.

Figure 9:
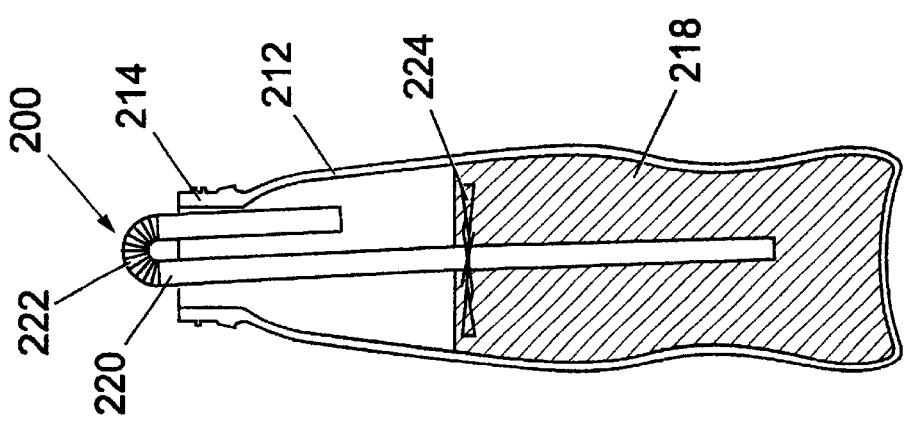
FIG. 9 shows the next stage in foaming of the beverage, and with the drinking straw beginning to rise out of the bottle.

The following stage is depicted in FIG. 9, wherein the expanding foam has just submerged the disc 224. The surging foam interacts with the disc 224 in a manner imparting uplift to the disc 224. Since the disc 224 is secured to the drinking straw 220, the interaction of the foaming beverage 218 with the disc 224 tends to uplift the straw 220. FIG. 9 shows the early stages of elevation of the straw 220 by the burgeoning foam.

Figure 11:
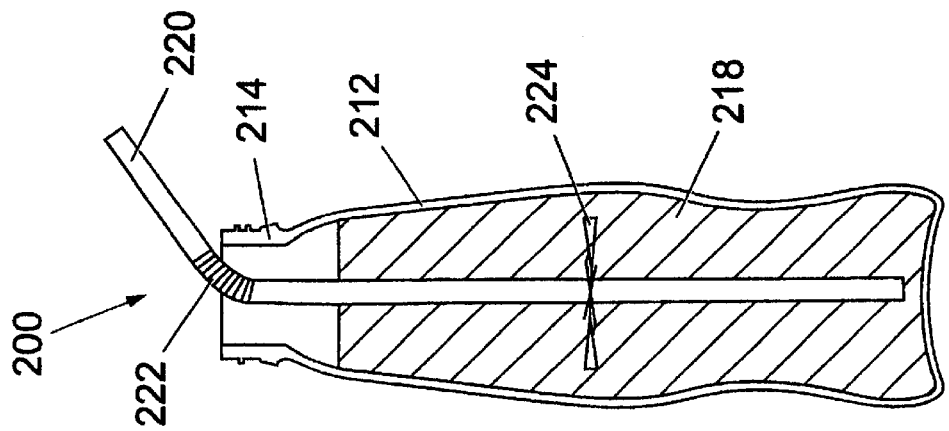
FIG. 11 shows an optional repositioning of the drinking straw within the bottle.
Figure 10:
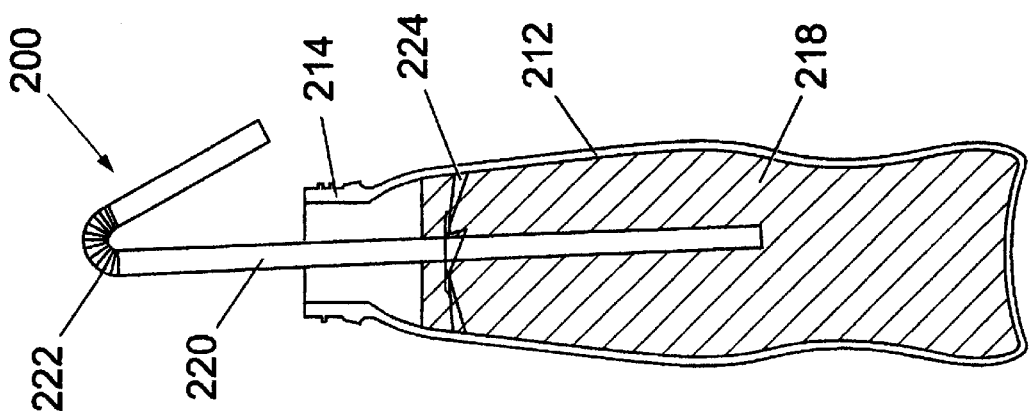
FIG. 10 shows completion of the foaming, and with the drinking straw at its maximum reach out of the bottle.

FIG. 10 depicts the foamed beverage at about its maximum volumetric expansion. The ingredients of the beverage 218 and the extent of its gasification are selected such that the fully expanded foam nearly fills the bottle 212, preferably without significant likelihood of overflowing the bottle neck 214 in typical ambient temperatures. The expanding foam will have lifted the straw 220 out of the bottle 212 to the maximum extent possible, which is deliberately limited to about what is depicted in FIG. 10 by reason of the overall diameter of the disc 224 being selected to be substantially greater than the internal diameter of the bottle neck 214 such that the disc 224 jams below the neck 214 as depicted in FIG. 10 whereby the straw 220 cannot completely separate from the bottle 212. Notwithstanding this limitation, the upper end of the straw 220 is now readily available to be contacted by the intended consumer of the foamed beverage, eg the free (upper) end of the straw above the bottle 212 can be manually grasped by the consumer, and the foamed beverage sucked through the straw 220. If the consumer desires, the inlet (lower) end of the straw 220 inside the bottle 212 can be lowered to the bottom of the bottle 212 as shown in FIG. 11 for the consumption of denser beverage foam (beverage having a greater ratio of liquid volume to bubble volume) or substantially unfoamed liquid beverage, according to circumstances.

It will be appreciated that FIGS. 8 to 10 are "snapshots" in a continuous process rather than discrete steps between unsealing of the package 210 and commencement of beverage consumption following foaming and straw elevation.

Figure 12:
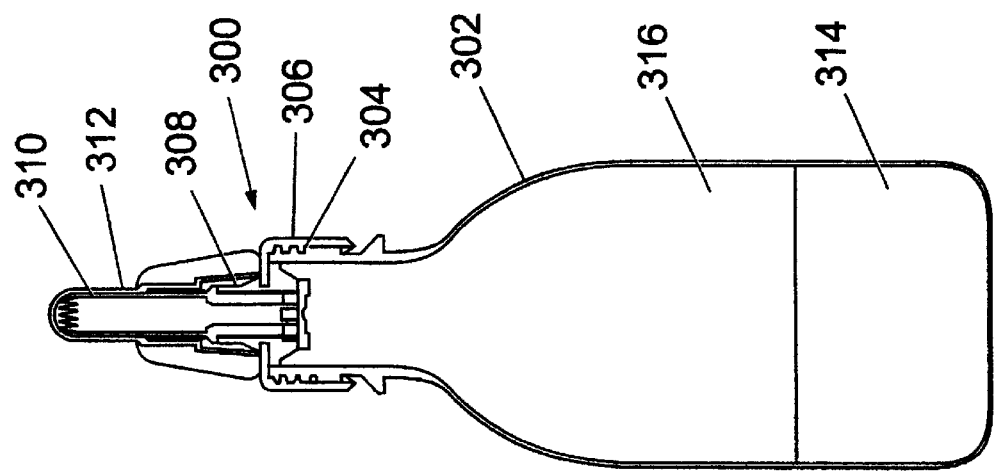
FIG. 12 is a side view in cross-section of a modified PET bottle for use in the method of the present invention.

Turning now to FIG. 12, a container 300 is shown which is for use in producing whipped cream.

The container 300 is shown in the form in which it would be offered to an end user. The container 300 consists of a small PET bottle 302 have a screw thread 304 at its neck for engagement with a threaded cap 306. The cap 306 has been modified by the inclusion of a conventional aerosol valve 308. The valve 308 is fitted with a serrated nozzle 310, and a protective end cap 312 seals the assembly.

The container 300 is filled in much the same way as previously described with reference to the other drawings. However, in this embodiment the liquid used is cream 314, preferably fresh cream. The cream 314 is filled to approximately one third of the volume of the bottle 302, prior to fitting the cap and valve assembly. The headspace 316 is then filled with nitrous oxide (in this example) to a pressure of 120 psi. This can be achieved using standard aerosol filling tools. The nozzle 310 and end cap 312 (and labels if desired) are then fitted to complete the product. After a short period in storage, the contents of the bottle reach equilibrium at approximately 60 psi. The product is then ready for use. In this example to dispense whipped cream, and end user simply removes the end cap 312, shakes the bottle, directs the nozzle end downwards and presses against the side of the nozzle 310. This action opens the valve 308 and the pressurised cream is released through the valve 308 and nozzle 310. The gas dissolved in the cream gives a "whipped" effect and the serrated nozzle 310 produces an attractive pattern on the cream as it is dispensed. The product described in this example is designed to be for a single use, in the sense that it should not be used in part, then restored, then used again. The purpose is to produce a limited amount of fresh whipped cream, after which the container is disposed.

The product should also be chilled prior to use. Temperature affects the absorption of the gas into the cream. In addition, the cream should be chilled to keep it fresh for a longer period of time.

Figure 13:
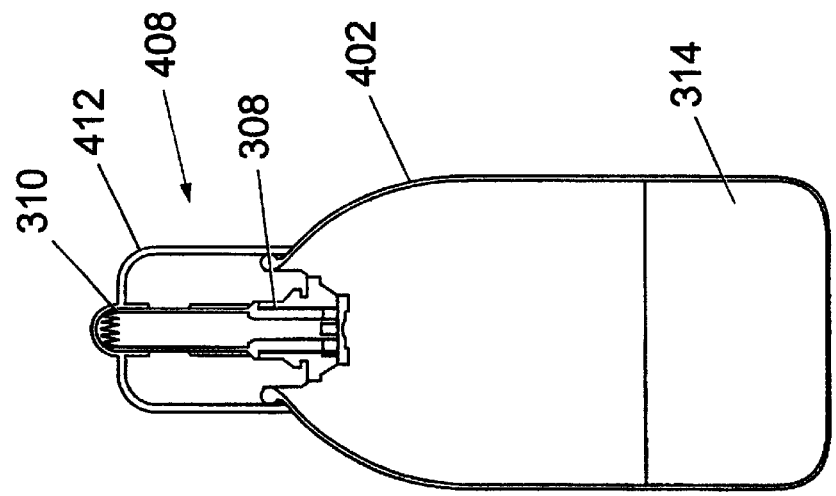
FIG. 13 is a side view in cross-section of a modified PET aerosol bottle with valve for use in the method of the present invention.

FIG. 13 shows a similar arrangement to that of FIG. 12. However, in FIG. 13 a PET aerosol container 402 is used to hold the cream 314. The PET aerosol 402 has a standard 1" (2.54 cm) opening in at its neck, to which a valve assembly 408 is fitted using known methods. The valve assembly includes a valve 308 and nozzle 310 as previously described. A modified end cap 412 is also provided.

The container of FIG. 13 is filled and used in much the same way as already described with reference to FIG. 12.

The embodiments described have many significant advantages over known arrangements, such known arrangements including aerosol cans for dispensing frothed longlife milk products. For example, the PET bottles used in the manufacture of the container of the present invention are much cheaper than metal aerosol cans. In addition, a small amount of fresh cream can be used to produce a significant amount of whipped cream. The shelf life of the product is prolonged by the use of nitrous oxide as it has preserving properties. Furthermore, the product is in effect "disposable" being for a single use only. Yet another advantage over know aerosol arrangements is that, because of the important ratio of liquid to headspace, gas can be introduced at a much lower pressure than otherwise possible (for example only 120 psi). The desired effect is still achieved. PET or other materials such as glass, can withstand these lower pressures, and there is no longer a need for stronger and far more costly metal cans.

Milk-based beverages other than those detailed above can be substituted without departing from the scope of the invention.

Modifications and improvements may be made to the foregoing without departing from the intended scope of invention. In particular, depending on the liquid involved and the desired properties of the beverage, different liquids and gases can be used, in different ratios of headspace to liquid and different gas pressures may be used. For example, to make a more dense beverage less headspace and higher pressure gas may be used. Furthermore, the invention extends to a beverage or frothed liquid produced in accordance with the method described, to the container used in the method, and to the special one-way valve described.

What is claimed is:

1. A method of producing a frothed cream or milk-based liquid comprising the steps of partially filling a container of plastics material with a cream or milk-based liquid, leaving a headspace in the container above the liquid, introducing pressurised gas into the headspace and sealing the container, characterised in that the headspace is between 50% and 80% of the total volume of the container, and the gas is pressurised to a pressure of between 138 and 1034 kN/m$^2$ (20 psi and 150 psi).

2. A method as claimed in claim 1 wherein the container is a PET bottle.

3. A method as claimed in claim 1 wherein the container is stored at below room temperature after sealing the container and prior to opening the container.

4. A container for use in the method of claim 3, wherein the container is a bottle of plastics material having an opening, the container comprising a valve arranged at the opening, the valve being fitted with a nozzle.

5. A container according to claim 4, wherein the opening comprises a neck having an external screw thread, the valve being fitted in a threaded cap adapted to screw onto the neck.

6. A container according to claim 4, wherein the opening comprises a neck having a standard 1" (25.4 mm) opening therein, the valve being part of a valve assembly fitted to the opening.

* * * * *